United States Patent
Komine et al.

(10) Patent No.: US 6,442,973 B1
(45) Date of Patent: Sep. 3, 2002

(54) SYNTHETIC SILICA GLASS AND ITS MANUFACTURING METHOD

(75) Inventors: Norio Komine; Seishi Fujiwara, both of Sagamihara; Akiko Yoshida, Kawasaki; Hiroki Jinbo, Yokohama, all of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/235,409

(22) Filed: Jan. 22, 1999

Related U.S. Application Data

(63) Continuation-in-part of application No. 08/581,017, filed on Jan. 3, 1996, now Pat. No. 6,087,283.

(30) Foreign Application Priority Data

| Jan. 6, 1995 | (JP) | 7-000479 |
| Jan. 13, 1995 | (JP) | 7-004077 |
| Jan. 23, 1998 | (JP) | 10-010929 |

(51) Int. Cl.$^7$ ............................................. C03B 19/06
(52) U.S. Cl. ..................... 65/17.4; 65/17.6; 65/32.1; 65/63; 65/104; 65/111; 65/117; 65/426; 501/12; 501/53; 501/54; 501/56
(58) Field of Search ............................... 65/17.4, 17.6, 65/32.1, 63, 104, 111, 117, 426; 501/12, 53, 54, 56

(56) References Cited

U.S. PATENT DOCUMENTS 5,707,908 A  1/1998  Komine et al. ............... 501/53

6,087,283 A * 7/2000 Jinbo et al. .................... 501/54

FOREIGN PATENT DOCUMENTS

| EP | 0 483 752 A2 | 5/1992 |
| EP | 0 525 984 A1 | 2/1993 |
| EP | 0 678 763 A1 | 10/1995 |
| EP | 0 720 969 A1 | 7/1996 |
| EP | 0 720 970 A1 | 7/1996 |
| EP | 0 735 006 A1 | 10/1996 |
| JP | 1-201664 | 8/1989 |
| JP | 3-109233 | 5/1991 |
| JP | 05-170466 | 7/1993 |
| JP | 05-186235 | 7/1993 |
| JP | A-7-247132 | 9/1995 |
| JP | A-9-52722 | 2/1997 |

* cited by examiner

Primary Examiner—Michael Colaianni
(74) Attorney, Agent, or Firm—Morgan, Lewis & Bockius LLP

(57) ABSTRACT

A method is provided for manufacturing a synthetic silica glass. The method includes the steps of maintaining a silica glass member, which is formed using a flame hydrolysis method and having an OH group concentration of about 500 ppm to about 1300 ppm, at a predetermined holding temperature for a predetermined period of time so as to substantially relax the structure of the silica glass member. The method further includes the step of subsequently cooling the silica glass member to a first predetermined temperature at a cooling rate of about 10 K/hour or less, and thereafter, cooling the silica glass member to a second predetermined temperature at a cooling rate of about 1 K/hour or less. The method further includes the step of further cooling the silica glass member to a third predetermined temperature at a cooling rate of about 10 K/hour or less.

34 Claims, 3 Drawing Sheets

SYNTHETIC SILICA GLASS AND ITS MANUFACTURING METHOD

This application is a continuation-in-part of application Ser. No. 08/581,017, filed Jan. 3, 1996 and issued as U.S. Pat. No. 6,087,283 on Jul. 11, 2000.

This application claims the benefit of Japanese Application No. 10-010929, filed in Japan on Jan. 23, 1998, which is hereby incorporated by reference.

BACKGROUND OF THE INVENTION

1. Field of the Invention

The present invention relates to a synthetic silica glass, and more particularly, to a synthetic silica glass that is used as an optical member in the wavelength range of 400 nm or less, and its manufacturing method.

2. Discussion of the Related Art

Currently, an exposure device called a stepper is used in photo-lithographic technology in which a very small pattern for an integrated circuit is exposed and transcribed onto a substrate, such as silicon wafer. Due to a recent demand towards higher integration of LSI, the light source of this stepper is becoming shorter and shorter; from the g-line (436 nm) to the i-line (365 mn), and further to KrF excimer lasers (248 nm) and ArF excimer lasers (193 nm). Existing optical glass has a low optical transmittance so that it cannot be used in the wavelength range that is shorter than the i-line. Therefore, in general, synthetic silica glass has been used for the optical member for the illumination system and the projection lens for the stepper.

However, even with the synthetic silica glass, a deterioration in optical performance, such as reduction in transmittance, occurs after the synthetic silica glass is used under high-powered ultraviolet rays or excimer laser for an extended period of time.

The cause of the deterioration in transmittance is considered to be structural defects, such as the E' center, NBOHC (Non-Bridging Oxygen Hole Center), and the like, generated in the silica glass due to irradiation by ultraviolet rays.

In the past, in order to improve the durability of the silica glass against ultraviolet rays, a technique in which silica glass is heated in a hydrogen atmosphere (Japanese Laid-Open Unexamined Patent Publication No. 01-201664) and a technique in which hydrogen molecules are doped into the silica glass (Japanese Laid-Open Unexamined Patent Publication No. 03-109233) have been proposed. These methods attempt to repair the structural defects by hydrogen to improve the durability against ultraviolet rays.

However, in these methods using hydrogen, although portions of the glass having these structural defects may temporarily be repaired, the precursors of the structural defects themselves cannot be removed. Examples of such precursors are Si—O—O—Si, Si—Si, and Si—Cl bonding structures, which are different from the bonding structure of silica (Si—O—Si), and distorted bonding structures in the Si—O—Si bonds. These precursors in silica glass are easily converted into structural defects under ultraviolet irradiation even after the structural defects are cured by hydrogen.

Thus, it is desirable to develop a synthetic silica glass and a manufacturing method for the synthetic silica glass, which has a superior durability against ultraviolet rays by directly reducing the precursors of the structural defects.

SUMMARY OF THE INVENTION

Accordingly, the present invention is directed to a synthetic silica glass and its manufacturing method that substantially obviate the problems due to limitations and disadvantages of the related art.

An object of the present invention is to provide a synthetic silica glass, which has less structural defects and thereby has a stable structure, and its manufacturing method.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a method for manufacturing a synthetic silica glass, the method including the steps of maintaining a silica glass member, which is formed using a flame hydrolysis method and having an OH group concentration of about 500 ppm to about 1300 ppm and a hydrogen molecule concentration of about $1 \times 10^{16}$ molecules/cm$^3$ or greater, at a predetermined holding temperature for a predetermined period of time so as to substantially relax the structure of the silica glass member; thereafter, cooling the silica glass member to a first predetermined temperature at a cooling rate of about 10 K/hour or less; thereafter, cooling the silica glass member to a second predetermined temperature at a cooling rate of about 1 K/hour or less; and thereafter, cooling the silica glass member to a third predetermined temperature at a cooling rate of about 10 K/hour or less.

In another aspect, the present invention provides a method for manufacturing a silica glass having a reduced structure determination temperature, the method including the steps of annealing a silica glass member having a glass state corresponding to a predetermined structure determination temperature, the annealing being performed at a first temperature lower than the predetermined structure determination temperature for a time period equal to or longer than a relaxation time of the silica glass member at the first temperature; and thereafter, cooling the silica glass member at such a cooling rate that until the silica glass member reaches a second temperature, the thermodynamical structural relaxation process of the silica glass member substantially follow the temperature changes, the cooling rate being such that below about the second temperature, the thermodynamical structural relaxation process of the silica glass member no longer substantially follow the temperature changes, thereby super-cooling the silica glass member to produce a silica glass having a structure determination temperature lower than the predetermined structure determination temperature.

In a further aspect, the present invention provides a method for manufacturing a silica glass having a reduced structure determination temperature, the method including the steps of forming a silica sample having a glass state corresponding to a predetermined structure determination temperature; annealing the silica sample at a first temperature lower than the predetermined structure determination temperature, the annealing being performed for a time period equal to or longer than a relaxation time of the silica sample at the first temperature; and thereafter, cooling the silica sample at such a cooling rate that until the silica sample reaches a second temperature, the cooling process is substantially quasistatic, the cooling rate being such that below about the second temperature, the cooling process no longer is substantially quasistatic, thereby super-cooling the silica sample to produce a silica glass having a structure determination temperature lower than the predetermined structure determination temperature.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1A:
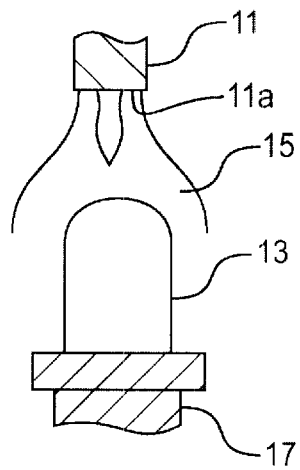
FIGS. 1A to 1D are cross-sectional schematic views which illustrate a preferred embodiment of the manufacturing method for synthetic silica glass according to the present invention.

Before describing the preferred embodiments and working examples of the present invention in detail, the results of studies participated by one or more of the present inventors, which led to the present invention, will be described.

With diligent efforts to develop a superior silica glass and its manufacturing method, it was discovered that a "structure determination temperature" (will be explained in detail below) significantly affects the durability of silica glass against ultraviolet rays. In connection with this finding, one of the present inventors has obtained U.S. Pat. No. 5,707,908, which is hereby incorporated by reference.

The structure determination temperature is a parameter which determines the structural stability. A super-cooled liquid increases its viscosity coefficient as the temperature decreases, and undergoes a transition to a glass state in a temperature range near a glass transition point. In this glass state, the density and the structure of the silica glass are frozen in a random state. Even when the temperature is reduced to a room temperature, the density and structure are maintained. This temperature at which the transition to the glass state occurs is referred to as "structure determination temperature" (the temperature at which the density and structure are frozen).

It was found that the lower the structure determination temperature is, the more the structural stability of the silica glass improves. It was also found that, along with the improvement of the structural stability, the durability of the silica glass against ultraviolet rays improves.

In order to reduce the structure determination temperature of the silica glass being synthesized, first, silica glass is synthesized using an ordinary direct method. Next, the synthetic silica glass is maintained at a holding temperature (annealing temperature) lower than the structure determination temperature of the silica glass produced by the synthesis for a time period longer than the structural relaxation time (time period required for the frozen structure to relax) at the holding temperature. Then, the glass is gradually cooled. By doing this, the initial structure of the silica glass, which resulted from the synthesis, is relaxed at the temperature lower than the structure determination temperature of the silica glass produced by the synthesis. Here, the temperature, at which the structure of the silica glass is re-frozen during the subsequent gradual cooling step, can be regarded as a new structure determination temperature.

The structural relaxation time for relaxing the structure is relatively short when the temperature to be maintained is high; however, as this holding temperature is lowered, the structural relaxation time exponentially increases. Consequently, it is desirable to lower the structure determination temperature within a range where a practically feasible structural relaxation time is obtained.

In addition, when the silica glass is maintained at a high temperature for a long period of time, the desorption of the hydrogen necessary to repair the structural defect may occur. Therefore, it is desirable to minimize the desorption of the hydrogen.

Thus, a synthetic silica glass with a superior durability against ultraviolet rays, and more particularly, a structurally stable synthetic silica glass with the generation of structural defects being suppressed and its manufacturing method is desired.

Based on the foregoing discoveries couple with the present inventors' additional efforts to develop a desired manufacturing method for synthetic silica glass, the present invention provides an improved manufacturing method for a synthetic silica glass. The method includes a structure relaxing step wherein a silica glass member obtained through a flame hydrolysis method with an OH group concentration between about 500 ppm and about 1300 ppm and a hydrogen molecule concentration of about $1\times10^{16}$ molecules/cm$^3$ or greater is maintained at a temperature at which the structure of the silica glass member is relaxed; a first cooling step for cooling the silica glass member processed in the structure relaxing step to a first predetermined temperature at a cooling rate of about 10° C./hour or less; a second cooling process for cooling the silica glass that is processed in the first cooling step to a second predetermined temperature at a cooling rate of about 1° C./hour or less; and a third cooling step for cooling the silica glass that is processed in the second cooling step to a third predetermined temperature at a cooling rate of 10° C./hour or less.

In another aspect of the method for manufacturing a synthetic silica glass according to the present invention, the method includes a step of changing the structure of a silica glass member synthesized through a flame hydrolysis method to a relaxed structure by maintaining the silica glass member for a predetermined period of time that is less than about 20 hours at a temperature between about 1223 K and about 1373 K; a step of gradually lowering the temperature of the silica glass member at a cooling rate of about 10 K/hour or less until the temperature of the silica glass member reaches about 1223 K; a step of gradually lowering the temperature of the silica glass member at a cooling rate of about 1 K/hour or less until the temperature of the silica glass member reaches about 1023 K; a step of lowering the temperature of the silica glass member at a cooling rate of about 10 K/hour or less until the temperature of the silica glass member reaches about 773 K; and a step of leaving the silica glass member in a normal atmospheric environment to allow the silica glass member to cool down to a room temperature.

Examples of the silica glass member recited above includes a silica glass ingot and a piece of silica glass obtained by cutting a silica glass ingot into a designated size. Here, a product obtained through the series of steps of heating and/or cooling the silica glass member is referred to as the synthetic silica glass.

Normally, the structure determination temperature of the silica glass member synthesized through the flame hydrolysis method is about 1400 K to about 1500 K By maintaining the silica glass member at a temperature within the range of about 1223 K to about 1373 K, which is lower than the above-mentioned structure determination temperature, for a time period that is less than about 20 hours (preferably about 5 hours to about 10 hours), but is long enough for the structure to relax, a silica glass member having a structure stable at the holding temperature can be obtained. Here, the structure stable at the holding temperature corresponds to a state in which the silica glass member reaches an equilibrium state for its atomic arrangement with respect to the holding temperature. As the annealing (holding) temperature at which the atomic structure is relaxed (temperature to be maintained) becomes lower, a lower new structure determination temperature can be obtained.

The time period required to relax the structure (minimum time period to be maintained) is referred to as a "structural relaxation time." As the holding temperature is lower, the structural relaxation time becomes longer. However, in order to prevent the removal (desorption) of the hydrogen from the silica glass member, it is desirable to set the time period during which the silica glass member is maintained at the holding temperature to less than about 20 hours. By taking into account the total manufacturing time of the silica glass, it is preferable to set the holding temperature to about 1223 K or greater (or about 1223 K at its minimum).

After the structure is relaxed, the silica glass member is gradually cooled at a cooling rate of about 10 K/hour or less until its temperature reaches the first predetermined temperature (a designated temperature within the range from about 1200 K to about 1250 K, for example). If instead of the above-described maintaining step, the silica glass member is to be maintained at the first predetermined temperature to relax its structure, this cooling process would be omitted. Further, in order to prevent the generation of a non-uniform temperature distribution in the silica glass member that may occur if the temperature is decreased abruptly, it is preferable to have a cooling rate of about 10 K/hour or less. During this step of gradually cooling the silica glass member to the first predetermined temperature, structural stabilization processes in the silica glass can substantially follow the temperature change of about 10 K/hour.

Then, the silica glass member that has reached the first predetermined temperature is gradually cooled at a cooling rate of about 1 K/hour or less until it reaches a second predetermined temperature (a designated temperature within the range from about 1000 K to about 1050 K, for example). During this process, the structure of the silica glass sample is frozen at a temperature within a range between the first and second predetermined temperatures. At a temperature higher than this temperature range, the silica glass member almost immediately reaches its equilibrium, and at a temperature lower than this temperature range, the atomic arrangement is kept frozen and the structural relaxation cannot occur. Therefore, in order to freeze the structure of the silica glass member at as low a temperature as possible, it is necessary to let the structural relaxation follow the temperature decrease by reducing the cooling rate to within the temperature range specified above, for example. Hence, it is desirable to set the cooling rate to about 1 K/hour or less (or about 1 K/hour at its maximum).

Then, the silica glass member is gradually cooled at a cooling rate of about 10 K/hour or less until the temperature of the silica glass reaches a third predetermined temperature (a temperature of about 800 K or less, for example). Then, the resultant silica glass member is cooled to a room temperature by leaving it in a normal atmospheric environment, thereby completing the manufacture of the synthetic silica glass according to the present invention.

It is preferable that combustion gases expelled from a burner made of silica glass used for the flame hydrolysis method include hydrogen gas and oxygen gas, and that the flow rate ratio of the oxygen gas to hydrogen gas is within the range of about 0.2 to about 0.5.

The flame hydrolysis method is a method for manufacturing silica glass ingots in which material gas and combustion gas are expelled from a burner to form a flame. Then, fused fine silica glass particles generated by the hydrolysis reaction in the flame are deposited on a target. Normally, the material gas includes a silicon compound and a carrier gas. The combustion gas includes oxygen gas and hydrogen gas. By setting the flow ratio of the oxygen gas to hydrogen gas flow to be in the range of about 0.2 to about 0.5, the OH group (Hydroxyl group) concentration contained in the synthesized silica glass ingot can be made within the range of about 500 ppm to about 1300 ppm.

In general, the bond angle between silicon atoms and oxygen atoms in the silica glass (Si—O—Si bond angle) has a distribution. In particular, the bond angle distribution includes structurally unstable bond angles. The structurally unstable bonds tend to become structural defects under irradiation of ultraviolet rays because such irradiation may break the unstable bonds. In other words, the structurally unstable bonds are precursors of the structural defects. The OH group is coupled with the reactant group that bridges tetrahedral structures, and therefore, it can prevent the bridging of the tetrahedral structures. As a result, the tetrahedral structures made of silicon and oxygen will not be bridged through unstable bonds, and therefore, it greatly increases the stability of the tetrahedral structure. Thus, when the OH group is present at a concentration of about 500 ppm to about 1300 ppm, it becomes possible to stabilize the structure of the silica glass and prevent the generation of structural defects.

Further, it is possible to produce the hydrogen molecules concentration of about $1 \times 10^{18}$ molecules/cm$^3$ or greater (at least about $1 \times 10^{18}$ molecules/cm$^3$) by setting the ratio of the oxygen gas flow rate to the hydrogen gas flow rate in the combustion gas to be about 0.2 to about 0.5. This way, the hydrogen dissolved in the silica glass has a concentration suitable for repairing the structural defects that may still be generated by irradiation of the silica glass with ultraviolet rays.

It is preferable that the silica glass member to be processed have a diameter of about 200 mm or greater (at least about 200 mm) and a thickness of about 100 mm or greater (at least about 100 mm). As stated above, the silica glass member corresponds to a silica glass ingot, a piece of silica glass cut out from a silica glass ingot, or the like. For example, in order to obtain a circular-column shaped member having a diameter of about 200 mm or greater and a thickness of about 100 mm or greater through cutting a silica glass ingot, the size of a silica glass ingot to be synthesized through the flame hydrolysis method preferably have a diameter of about 250 mm or greater and a thickness of about 300 mm or greater. By cutting this silica glass ingot, the circular-column shaped silica glass member with a diameter of about 200 mm or greater and a thickness of about 100 mm is produced. Then, the resulting silica glass member undergoes heating and cooling processes to produce the synthetic silica glass of the present invention.

During the processes of heating and gradually cooling the silica glass member, some amount of hydrogen is desorbed (removed) from the silica glass member. However, with a silica glass member having a size greater than the above-mentioned size, it is possible to have a hydrogen concentration sufficient for repairing the structural defects that may still be generated in the synthesized silica glass.

In accordance with the manufacturing method of the synthesized silica glass of the present invention, a new structure determination temperature, which is lower than the structure determination temperature in the conventional method can be achieved. Thus, the resultant synthetic silica glass has a more stable structure than the conventional synthetic silica glass. The synthetic silica glass with such a stable structure has a reduced number of unstable bonds among the constituent atoms, and therefore it is possible to prevent the generation of structural defects. In addition, even if the structural defects are generated due to irradiation by ultraviolet rays of the synthetic silica glass, the hydrogen dissolved in the synthetic silica glass can repair the defective portions. Consequently, the durability of the synthesized silica glass against ultraviolet rays can further be improved.

Reference will now be made in detail to the preferred embodiments and working examples of the present invention, examples of which are illustrated in the accompanying drawings.

Referring to FIGS. 1A to 1D, which show cross-sectional schematic views of various stages of the manufacturing method for synthetic silica glass, a preferred embodiment of the present invention will be described.

First, a silica glass ingot is synthesized using a direct method. Silica glass synthesized through the direct method has fewer precursors of the structural defects than silica glass that is synthesized through other methods, and has a high purity. A silica glass ingot 13 is synthesized using a burner 11 made of silica glass. Nozzle 11a of the burner 11 is equipped with a material supply tube for expelling a silicon compound, which is a material for the silica glass synthesis, along with a carrier gas, and combustion gas supply tubes for expelling oxygen gas and hydrogen gas for forming a flame. By expelling and reacting the oxygen gas and hydrogen gas from the combustion gas supply tubes in the nozzle 11a, flame 15 is formed. At the same time, the material gas including a silicon compound and a carrier gas is expelled. This material gas is hydrolyzed in the flame 15, and as a result, fine particles of fused silica glass (soot) are produced. A silica glass ingot 13 is synthesized by depositing this silica glass soot on a target 17, which is made of silica glass and faces towards the nozzle 11a of the burner 11, and by vitrifying it (FIG. 1A).

Here, the ratio of the oxygen gas flow rate to the hydrogen gas flow rate in the combustion gas expelled from the combustion gas supply tubes of the burner 11 is set to between about 0.2 and about 0.5. By doing so, it is possible to obtain the OH group (hydroxyl group) concentration of about 500 ppm to about 1300 ppm in the synthesized silica glass ingot 13. In addition, through this flame-hydrolysis method, it is possible to obtain the hydrogen molecules concentration of $1 \times 10^{18}$ molecules/cm$^3$ or more in the silica glass ingot 13.

Figure 1B:
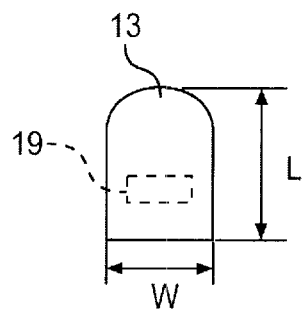

A cross-section obtained by cutting the silica glass ingot 13 at a plane perpendicular to the direction of the growth of the ingot at the center portion of the silica glass ingot is circular. In this preferred embodiment, the synthesizing conditions, such as the flow rates of the material gas and the combustion gases and the rotating and lowering rates of the target, are adjusted so that the diameter W of the circular cross-section (referred to as diameter W of the ingot) becomes about 250 mm or greater and length L (height L) of the ingot 13 becomes about 300 mm or greater. Once the silica glass ingot 13 with the diameter W of about 250 mm or greater and the height L of about 300 mm or greater is obtained, it is possible to cut out from the ingot 13 silica glass member 19 with a diameter of about 200 mm or greater and a thickness of about 100 mm or greater (FIG. 1B). In the present invention, when the silica glass member 19 with a diameter of about 200 mm or greater and a thickness of about 100 mm or greater is obtained, the thus cut-out piece of silica glass (silica glass member 19) can contain hydrogen in the amount appropriate for repairing the structural defects, even if the desorption of hydrogen from the silica glass member 19 occurs during the subsequent heating and cooling processes, which are described below.

Figure 1C:
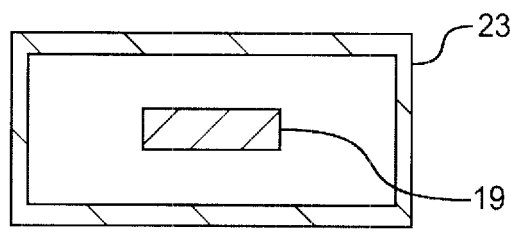
Figure 1D:

Next, the silica glass member 19 is maintained at a holding temperature that is between about 1223 K and about 1373 K for a period of about 20 hours or less. In order to lower the structure determination temperature, it is preferable to set the temperature to be less than about 1373 K On the other hand, in order to relax the structure through sufficient annealing of the silica glass member 19, it is preferable to set the temperature to more than about 1223 K Thereafter, the silica glass member 19 goes through a series of cooling processes; the silica glass member 19 is gradually cooled to about 1223 K at a cooling rate of about 10 K/hour or less, is gradually cooled from about 1223 K to about 1023 K at a cooling rate of about 1 K/hour, and then is gradually cooled down to about 723 K at a cooling rate of about 10 K/hour. Finally, the silica glass member is left in a normal atmospheric condition to cool down to a room temperature, completing the manufacture of a synthetic silica glass 25 having a stable structure (FIGS. 1C and 1D).

These heating and cooling processes are carried out, for example, using an annealing furnace 23 constructed of fire-proof bricks. The atmosphere in which these processes can be carried out is not limited to a particular condition; these processes can be carried out in the air, for example. Further, there is no specific limitation on the pressure under which these processes can be carried out; the processes can be carried out at a normal atmospheric pressure, for example.

Referring now to the accompanying drawings, working examples of silica glass and its manufacturing method according to the present invention together with comparative examples are described.

FIRST WORKING EXAMPLES

Figure 2:
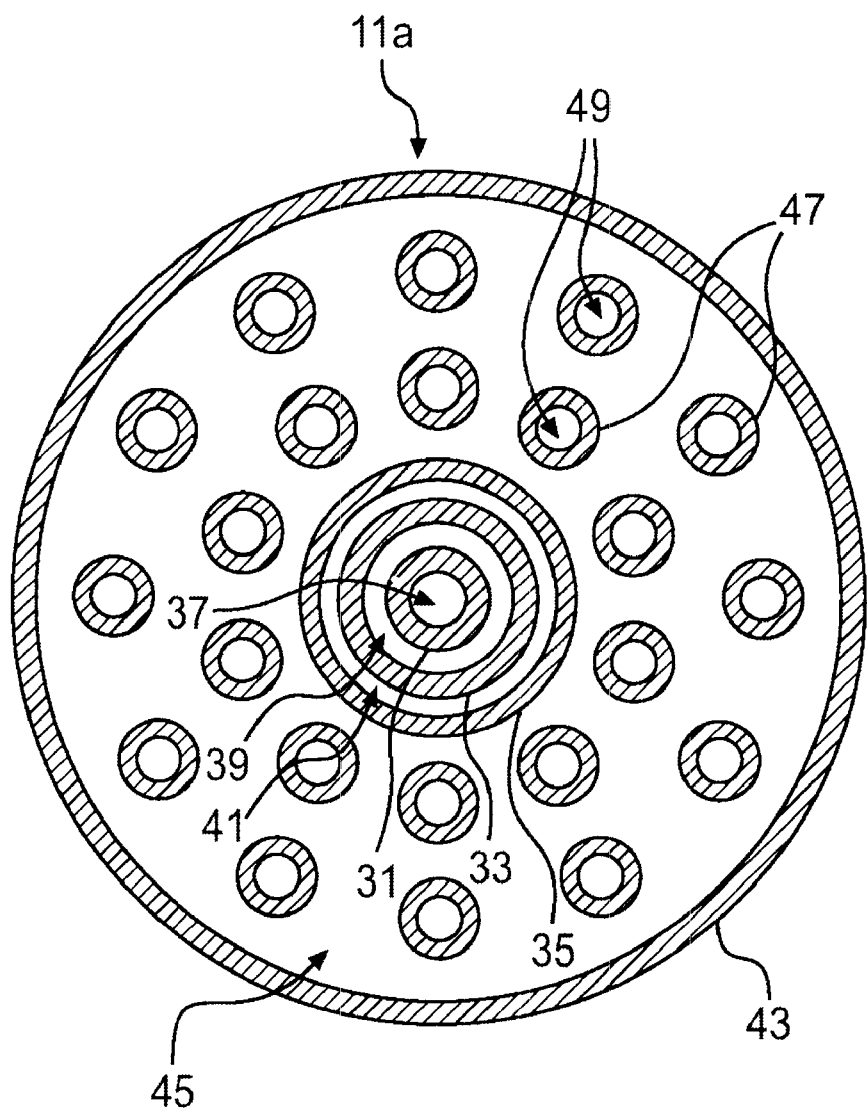
FIG. 2 is a schematic view of a nozzle of a silica glass burner used in manufacturing working examples of the present invention.

First, a silica glass ingot 13 was synthesized by a direct method using a burner 11 made of silica glass (FIG. 1A). The structure of nozzle 11a of the burner 11 used in this example is illustrated in FIG. 2, which is a schematic plan view of the nozzle 11a of the burner 11.

A material supply pipe 31 (first pipe) with an inner diameter of 4.5 mm was arranged at the center of the nozzle 11a. Outside of the material supply pipe 31, second pipe 33 and third pipe 35 were arranged in a concentric manner with respect to the material supply pipe 31. The opening of the first pipe 31 was used as a material gas exit 37. The 1 mm gap between the first pipe 31 and the second pipe 33 was used as a first oxygen gas exit 39. The 1 mm gap between the second pipe 33 and the third pipe 35 defined a first hydrogen gas exit 41. A fourth pipe 43 was disposed outside of the third pipe 35 in a concentric manner. The gap between the third pipe 35 and the fourth pipe 43 was 45 mm and was used as a second hydrogen gas exit 45. In the region between the third and fourth pipes, twenty two (22) of fifth pipes 47 each having an inner diameter of 6.0 mm were arranged in a double-annular manner with respective constant spacings. Each of the openings of the fifth pipes 47 was used as a second oxygen gas exit 49.

From the material gas exit 37, a material gas in which silicon tetrafluoride gas was diluted with a carrier gas was expelled at a flow rate of 5.27 slm. The silicon tetrafluoride used here had a purity of 99.99% or higher; the Fe concentration (metallic impurities) was 10 ppb or less and the Ni and Cr concentrations were both 2 ppb or less.

From the first oxygen gas exit 39, an oxygen gas was expelled at a flow rate of 22 slm. From the first hydrogen gas exit 41, a hydrogen gas was expelled at a flow rate of 75 slm. Furthermore, a hydrogen gas was expelled from the second hydrogen gas exit 45 and an oxygen gas was expelled from each of the 22 second oxygen gas exits 49.

In this working example, the ratio of the total oxygen gas flow rate, which is the sum of the oxygen gas flow rates in all the pipes that expel oxygen gases, to the total hydrogen gas flow rate, which is the sum of the hydrogen gas flow rates in all the pipes that expel hydrogen gases, was set to 0.4. The total hydrogen gas flow rate was about 400 to 500 slm.

A flame 15 was formed by expelling from nozzle 11a and burning the hydrogen gases and the oxygen gases (FIG. 1A). At the same time, the material gas was expelled into the flame 15, and was hydrolyzed. As a result, silica glass soot, which was fused by the flame 15, was formed. This silica glass soot was deposited on a target 17, which was arranged to face towards the burner. The silica glass soot was vitrified at the target 17, and a silica glass ingot 17 was produced.

In this working example, target 17 was made of silica glass and had a diameter of 200 mm and a thickness of 10 mm. The target 17 was rotated at a rate of 7 rotations per minute, and was horizontally moved back and forth within the range of 80 mm with a period of 90 seconds/cycle. At the same time, the surface of the target 17, on which the silica glass soot was to be deposited, was lowered at a speed of 3.93 mm/hour. Here, the target 17 and the burner 11 were arranged to face each other in a reaction furnace. Through these processes, a silica glass ingot 13 having a diameter of 250 mm and a height of 400 mm was obtained.

Next, from the center portion of this silica glass ingot 13, a silica glass member 19 with a diameter of 200 and a thickness of 100 mm was cut out (FIG. 1B). The silica glass member 19 was annealed in an annealing and cooling furnace 23 in the air at a normal atmospheric pressure at a temperature of 1273 K for 10 hours. Thereafter, the temperature was lowered to 723 K at a cooling rate of 1 K/hour (FIG. 1C). The temperature was further lowered by leaving the silica glass member 17 in a normal atmosphere condition and letting it naturally cool down to a room temperature. As a result, synthetic silica glass 25 of the first working example was obtained.

Next, the structure determination temperature of the resultant synthetic silica glass 25 of the first working example was evaluated. First, a plurality of reference samples was produced by cutting silica glass, which was synthesized by the direct method, for the purpose of obtaining a determination curve that is necessary to determine the structure determination temperature of silica glass 25. These reference samples were respectively placed in a pipe-shaped furnace made of silica glass and were annealed under a normal atmospheric pressure at various constant annealing temperatures ranging from 1073 K to 1700 K (with a temperature interval of 100 K starting from 1073 K, for example). The annealing time periods for these reference samples were set to be longer than the structural relaxation time at the respective annealing temperatures. Therefore, the structure of each silica glass reference sample was sufficiently relaxed to a stable structure corresponding to the respective annealing temperature.

Next, these reference samples were dipped into liquid nitrogen immediately after they were removed from the pipe-shaped furnace maintained at the respective high temperatures (within 0.2 seconds) to cool the samples abruptly. This way, it was possible to freeze the structures of the reference samples that were stabilized at the respective annealing temperatures. Thus, the temperature maintained in the annealing process can be regarded as the structure determination temperature for the corresponding reference sample. As a result, a plurality of reference samples, which have different structures corresponding to different structure determination temperatures ranging from 1073 K to 1700 K, were obtained.

The Raman scattering measurements were performed on these silica glass reference samples. Here, the ratio of the line intensity at a wave number of 606 $cm^{-1}$ to the line intensity at a wave number of 800 $cm^{-1}$ (referred to as "line intensity ratio") was measured. The line intensity at a wave number of 606 $cm^{-1}$ depends on the bonding angles between silicon and oxygen in silica glass, and therefore, it indicates the structure determination temperature of the silica glass. The line intensity at a wave number of 800 $cm^{-1}$ is independent of the structure of the silica glass, and therefore, is used as a reference.

Through the Raman scattering measurements of the reference samples, their line intensity ratios were obtained. By interpolating this discrete set of data, a determination curve representing a relationship between the structural determination temperature (annealing temperature) and the line intensity ratio in the Raman scattering measurement was obtained.

The Raman scattering measurements were carried out for the synthetic silica glass 25 of the first working example, and the ratio of the line intensity at a frequency of 606 $cm^{-1}$ to the line intensity at a frequency of 800 $cm^{-1}$ was obtained for the silica glass 25. By applying the determination curve obtained above to the line intensity ratio measured, the structure determination temperature of the silica glass 25 of the first working example was found. The result was 1075 K (Table 1).

Next, the transmission characteristics with respect to ultraviolet light of the synthetic silica glass of the first working example were studied. First, a test piece having a diameter of 60 mm and a thickness of about 10 mm was cut out from the synthetic silica glass of the first working example. Precision polishing was applied to the top and bottom surfaces of the test piece so that the two surfaces were parallel to each other within 10 seconds, Newton rings which indicate the flatness of each surface were measured to be 3 or less and the roughness of the surface for each side was within about 10 Å in rms. Then, the test piece was polished so that the final thickness of the test piece was 10±0.1 mm. Then, a finishing polish process using high-purity $SiO_2$ powders was carried out so that the polishing agent did not remain on the surface of the test piece.

The ultraviolet light transmission properties of the test piece can be evaluated by the bulk absorption coefficient. The lower value of the bulk absorption coefficient corresponds to better transmittance. The bulk absorption coefficient was derived from the following well known equation.

$$\text{Bulk Absorption Coefficient} = \frac{\ln(\text{Internal Transmittance}/\text{Theoretical Transmittance})}{\text{Thickness of the sample piece}}$$

The internal transmittance of the test piece for a light ray having a wavelength of 193.4 nm (corresponds to an ArF excimer laser) was measured by a spectrophotometer. The obtained value was inserted into the above equation and the bulk absorption coefficient was obtained. Here, the theoretical transmittance is a transmittance that includes only light quantity losses that occur at surfaces of the test piece through reflection or the like without taking into account the effects of the internal absorption loss.

The bulk absorption coefficient of the synthetic silica glass of the first working example at a wavelength of 193.4 nm was found to be 0.01 $cm^{-1}$ or less. Thus, the synthetic silica glass of the first working example has an excellent transmittance.

An analysis on impurities contained in the synthetic silica glass of the first working example was also conducted. A 10 mm×10 mm×5 mm test piece was cut out from the synthetic silica glass. Using an activation analysis through irradiating the test piece with thermal neutron rays, quantitative analyses with respect to Na and K were carried out.

The results showed that the concentration of Na was below the detection limit (1 ppb) and the concentration of K was also below the detection limit (50 ppb).

Furthermore, quantitative analyses with respect to concentrations of alkaline earth metals, transition metals, and Al were conducted for test pieces cut out from the synthetic silica glass of the first working example using an inductive coupling type plasma emission spectroscopy. The concentrations of Mg and Ca, which are alkaline earth metals, were both found to be 20 ppb. The concentrations of Sc, Ti, V, Cr, Mn, Fe, Co, Ni, Cu and Zn, which are transition metals, were all found to be 20 ppb or less. The concentration of Al was also found to be 20 ppb or less.

The concentration of the OH group was measured by an infrared absorption spectroscopy (measuring absorption at 1.38 μm due to the stretching vibration of the OH group). In addition, the concentration of hydrogen molecules was measured by the laser Raman spectroscopy (measuring a peak intensity of 4135 $cm^{-1}$ due to vibration of the hydrogen molecules). The results are shown in Table 1.

TABLE 1

| | Structure Determination Temperature (K.) | OH Group concentration (ppm) | Hydrogen molecules concentration (molecules/$cm^3$) |
|---|---|---|---|
| First Working Example | 1075 | 935 | $2.2 \times 10^{18}$ |
| Modified First Working Example | 1159 | 911 | $2.3 \times 10^{18}$ |
| Second Working Example | 1117 | 976 | $2.4 \times 10^{18}$ |
| Modified Second Working Example | 1188 | 968 | $2.4 \times 10^{18}$ |

According to Table 1, the synthetic silica glass of the first working example had an OH group concentration of 935 ppm and a hydrogen molecule concentration of $2.2 \times 10^{18}$ molecules/$cm^3$.

Next, the durability of the synthetic silica glass against ultraviolet light was studied. A test piece was cut out from the synthetic silica glass of the first working example. An ArF excimer laser was radiated onto the test piece with each pulse having an energy density of 200 mJ/$cm^2$/pulse and at a pulse frequency of 100 Hz. The E' centers, a type of the structural defects in the silica glass generated by the irradiation of the excimer laser, contribute to the formation of an absorption band having a peak at a wavelength of 215 nm. Therefore, changes in the absorption coefficient at the wavelength of 215 nm with the cumulative pulse number of the excimer laser irradiating the test piece were measured. The results are shown in FIG. 3.

Figure 3:
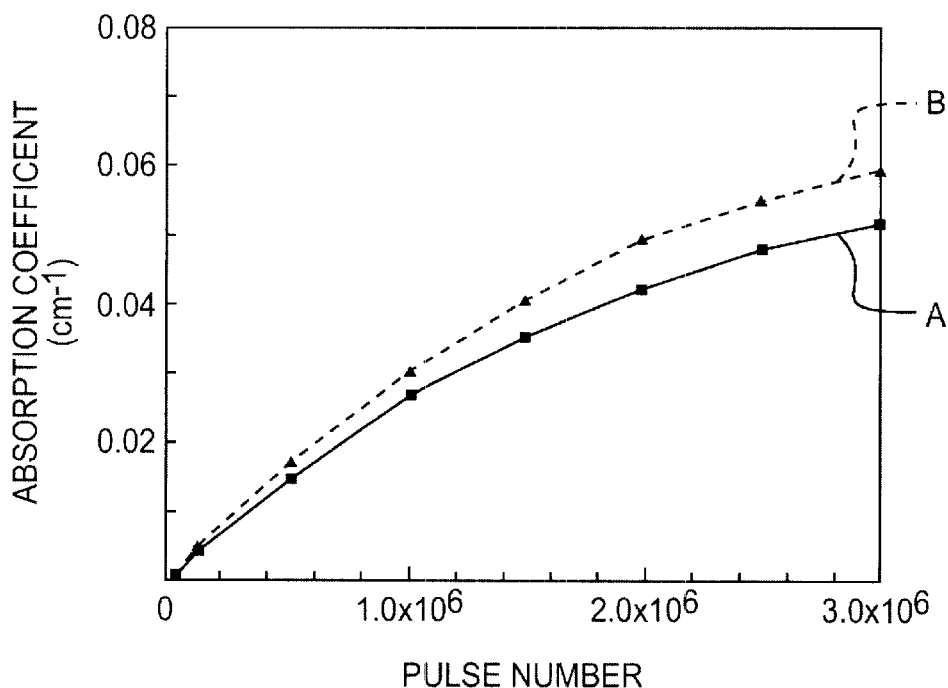
FIG. 3 shows measured durabilities against ultraviolet rays for a first working example of the synthetic silica glass of the present invention and a modified first working example of the present invention.

The curve A in FIG. 3 is the characteristic curve indicating the durability of the silica glass of the first working example against ultraviolet rays. In FIG. 3, the horizontal axis indicates the pulse number of the excimer laser, the vertical axis indicates the measured absorption coefficient at 215 nm. The values of the absorption coefficient at 215 nm plotted in the figure were obtained through the measurements of the internal transmittance of the test piece two minutes after respective numbers of excimer laser pulse irradiation were completed. The calculation of the absorption coefficient from the internal transmittance was carried out in the same manner as described above. The lower the value of the absorption coefficient at 215 nm is, the fewer the E' centers. Therefore, if the rate of increase in the absorption coefficient with increase in the pulse number is smaller, such silica glass has a superior durability against ultraviolet rays.

As shown in FIG. 3, for the synthetic silica glass in the first working example, the absorption coefficient of the test piece before irradiation by an excimer laser was 0.001 $cm^{-1}$. The absorption coefficient after irradiation with a pulse number of $1.0 \times 10^4$ was 0.001 $cm^{-1}$. The absorption coefficient after irradiation with a pulse number of $3.0 \times 10^4$ was 0.002 $cm^{-1}$. The absorption coefficient after irradiation with a pulse number of $1.0 \times 10^5$ was 0.004 $cm^{-1}$. The absorption coefficient after irradiation with a pulse number of $5.0 \times 10^5$ was 0.015 $cm^{-1}$. The absorption coefficient after irradiation with a pulse number of $1.0 \times 10^6$ was 0.027 $cm^{-1}$. The absorption coefficient after irradiation with a pulse number of $1.5 \times 10^6$ was 0.035 $cm^{-1}$. The absorption coefficient after irradiation with a pulse number of $2.0 \times 10^6$ was 0.042 $cm^{-1}$. The absorption coefficient after irradiation with a pulse number of $2.5 \times 10^6$ was 0.048 $cm^{-1}$. The absorption coefficient after irradiation with a pulse number of $3.0 \times 10^6$ was 0.051 $cm^{-1}$.

Modified First Working Example

To produce a first modified working example, which is to be compared with the first working example, a silica glass member with a diameter of 200 mm and a thickness of 100 mm was cut out from a silica glass ingot formed in a similar manner to that in the first working example.

Then, the silica glass member was maintained at a temperature of 1273 K in the air at a normal atmospheric pressure for 10 hour. Then, the silica glass member was gradually cooled at a cooling rate of 10 K/hour until the temperature of the member reached 723 K Thereafter, the member was left under a normal atmospheric condition to cool down to a room temperature to produce the synthetic silica glass of the modified first working example.

The characteristics of the synthetic silica glass of the modified first working example was measured in the same manner as in the first working example above. The results are shown in Table 1 and FIG. 3.

For the modified first working example, the structure determination temperature was found to be 1159 K, which is significantly higher than the synthetic silica glass of the first working example (by 84 K).

The initial bulk absorption coefficient at a wavelength of 193.4 nm, which indicates the ultraviolet transmission properties, was 0.01 cm$^{-1}$ or less, showing that it also had an excellent initial transmittance as in the first working example.

The concentrations of metallic impurities in the synthetic silica glass of the modified first working example were also measured in the same manner as above, and were found to be as low as in the first working example.

The OH group concentration was found to be 911 ppm and the hydrogen molecule concentration was found to be 2.3×10$^{18}$ molecules/cm$^3$. This indicates that the OH group contained in the synthetic silica glass of the modified first working example was less than the OH group contained in the synthetic silica glass of the modified first working example. Thus, the synthetic silica glass of the modified first working example is more likely to have structurally unstable bonds than the synthetic silica glass of the first working example.

As shown in FIG. 3, as for the durability against ultraviolet rays, the absorption coefficient prior to irradiation by an excimer laser was 0.001 cm$^{-1}$. The absorption coefficient after irradiation with a pulse number of 1.0×10$^4$ was 0.001 cm$^{-1}$. The absorption coefficient after irradiation with a pulse number of 3.0×10$^4$ was 0.002 cm$^{-1}$. The absorption coefficient after irradiation with a pulse number of 1.0×10$^5$ was 0.005 cm$^{-1}$. The absorption coefficient after irradiation with a pulse number of 5.0×10$^5$ was 0.017 cm$^{-1}$. The absorption coefficient after irradiation with a pulse number of 1.0×10$^6$ was 0.030 cm$^{-1}$. The absorption coefficient after irradiation with a pulse number of 1.5×10$^6$ was 0.040 cm$^{-1}$. The absorption coefficient after irradiation with a pulse number of 2.0×10$^6$ was 0.049 cm$^{-1}$. The absorption coefficient after irradiation with a pulse number of 2.5×10$^6$ was 0.055 cm$^{-1}$. The absorption coefficient after irradiation with a pulse number of 3.0×10$^6$ was 0.059.

FIG. 3 compares the characteristic curve A showing the absorption coefficient behavior of the first working example with the characteristic curve B showing the absorption coefficient behavior of the modified first working example. It is seen that the rate of increase of the absorption coefficient with the increase in the pulse number is higher for the synthetic silica glass of the modified first working example. Therefore, it was confirmed that when the cooling rate of the silica glass member from 1273 K to 723 K is set to be a relatively slow cooling rate of 1 K/hour, it is possible to further improve the durability of the synthetic silica glass against ultraviolet rays.

SECOND WORKING EXAMPLES

In a second working example, instead of silicon tetrafluoride used in manufacturing the first working example, silicon tetrachloride was used as the material for manufacturing the silica glass. Below, only the manufacturing conditions that are different from those used in the first working example are described, and accordingly, the detailed descriptions of like conditions are omitted.

A silica glass ingot was synthesized by a direct method in the same manner as that in the first working example. The flow rate of the silicon tetrafluoride was set to be 30 g/min. The other synthesizing conditions were the same as those in the first working example. The resulting silica glass ingot had a diameter of 250 mm and a height of 400 mm.

Next, from the center portion of the silica glass ingot, a silica glass member with a diameter of 200 mm and a thickness of 100 mm was cut out. As in the first working example, this silica glass member was maintained at a normal atmospheric pressure at a temperature of 1273 K for 10 hours. Then, the silica glass member was gradually cooled at a cooling rate of 1 K/hour until the temperature reached 723 K Thereafter, the silica glass member was left under a normal atmospheric condition to cool down to a room temperature to produce the synthetic silica glass of the second working example.

The structure determination temperature of the synthetic silica glass of the second working example was determined in the same manner as in the first working example, which yielded 1117 K (See Table 1).

The ultraviolet light transmission properties of the synthetic silica glass of the second working example were studied in the same manner as in the first working example. The initial bulk absorption coefficient at a wavelength of 193.4 nm was 0.001 cm$^{-1}$ or less, showing that it also has excellent initial transmission properties.

The concentration of the metallic impurities in the synthetic silica glass was found to be sufficiently low, as in the first working example.

The concentration of the OH group in the synthetic silica glass was found to be 976 ppm, and the concentration of the hydrogen molecules was found to be 2.4×10$^{18}$ molecules/cm$^3$ (See Table 1).

Figure 4:
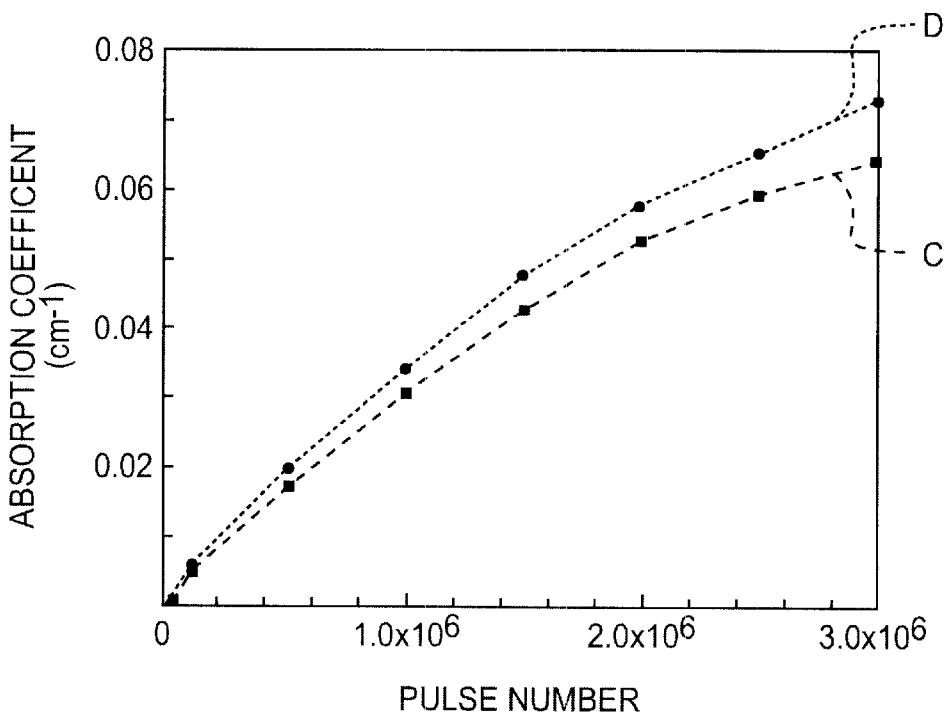
FIG. 4 shows measured durabilities against ultraviolet rays for a second working example of the synthetic silica glass of the present invention and a modified second working example of the present invention.

FIG. 4 shows the measured absorption coefficients versus the number of the laser pulses, indicating the durability against ultraviolet rays. The characteristic curve C in FIG. 4 shows the changes in the absorption coefficient at a wavelength of 215 nm for the silica glass piece of the second working example versus the cumulative pulse number of the excimer laser. As in FIG. 3, the horizontal axis shows the pulse number of the excimer laser and the vertical axis shows the measured absorption coefficient at a wavelength of 215 nm.

As shown in FIG. 4, the absorption coefficient of the test piece before irradiation by an excimer laser was found to be 0.001 cm$^{-1}$. The absorption coefficient after irradiation with a pulse number of 1.0×10$^4$ was 0.002 cm$^{-1}$. The absorption coefficient after irradiation with a pulse number of 3.0×10$^4$ was 0.003 cm$^{-1}$. The absorption coefficient after irradiation with a pulse number of 1.0×10$^5$ was 0.005 cm$^{-1}$. The absorption coefficient after irradiation with a pulse number of 5.0×10$^5$ was 0.018 cm$^{-1}$. The absorption coefficient after irradiation with a pulse number of 1.0×10$^6$ was 0.030 cm$^{-1}$. The absorption coefficient after irradiation with a pulse number of 1.5×10$^6$ was 0.042 cm$^{-1}$. The absorption coefficient after irradiation with a pulse number of 2.0×10$^6$ was 0.053 cm$^{-1}$. The absorption coefficient after irradiation with a pulse number of 2.5×10$^6$ was 0.060 cm$^{-1}$. The absorption coefficient after irradiation with a pulse number of 3.0×10$^6$ was 0.065 cm$^{-1}$.

Modified Second Working Example

To produce a modified second working example, which is to be compared with the second working example above, a silica glass member having a diameter of 200 mm and a thickness of 100 was cut out from a silica glass ingot that was obtained in the same manner as that in the second working example.

Then, the silica glass member was maintained at a temperature of 1273 K in the air at a normal atmospheric pressure for 10 hours. Then, the silica glass member was gradually cooled at a cooling rate of 10 K/hour until the temperature of the silica glass member reached 723 K Thereafter, the silica glass member was left under an normal atmospheric condition to cool down to a room temperature to obtain the synthetic silica glass of the modified second working example.

The characteristics of the synthetic silica glass of the modified second working example were evaluated in the same manner as in the second working example above. The results are shown in Table 1. The characteristic curve D in FIG. 4 shows the changes in the absorption coefficient at a wavelength of 215 nm with the pulse number for the synthetic silica glass for the modified second working example.

The structure determination temperature of the modified second working example was found to be 1188 K, which is significantly higher than that of the synthetic silica glass of the second working example (by 71 K).

The initial bulk absorption coefficient at a wavelength of 193.4 mn, which indicates the initial ultraviolet transmittance properties, was found to be 0.001 cm$^{-1}$ or less, showing that it has excellent transmission properties as in the second working example. Also, the metallic impurities concentration in the synthetic silica glass was found to be sufficiently low as in the second working example.

The concentration of the OH group was found to be 968 ppm and the hydrogen molecule concentration was found to be 2.4×10$^{18}$ molecules/cm$^3$. This indicates that the amount of the OH group contained in the synthetic silica glass of the modified second working example is less than the amount of the OH group contained in the synthetic silica glass of the second working example. Therefore, the silica glass of the modified second working example is more likely to have structurally unstable bonds than the synthetic silica glass of the second working example.

As for the durability against ultraviolet rays, as shown in FIG. 4, the absorption coefficient prior to irradiation by an excimer laser was 0.001 cm$^{-1}$. The absorption coefficient after irradiation with a pulse number of 1.0×10$^4$ was 0.002 cm$^{-1}$. The absorption coefficient after irradiation with a pulse number of 3.0×10$^4$ was 0.003 cm$^{-1}$. The absorption coefficient after irradiation with a pulse number of 1.0×10$^5$ was 0.006 cm$^{-1}$. The absorption coefficient after irradiation with a pulse number of 5.0×10$^5$ was 0.019 cm$^{-1}$. The absorption coefficient after irradiation with a pulse number of 1.0×10$^6$ was 0.034 cm$^{-1}$. The absorption coefficient after irradiation with a pulse number of 1.5×10$^6$ was 0.047 cm$^{-1}$. The absorption coefficient after irradiation with a pulse number of 2.0×10$^6$ was 0.058 cm$^{-1}$. The absorption coefficient after irradiation with a pulse number of 2.5×10$^6$ was 0.066 cm$^{-1}$. The absorption coefficient after irradiation with a pulse number of 3.0×10$^6$ was 0.073 cm$^{-1}$.

Comparing the characteristic curve C of the absorption coefficient for the second working example in FIG. 4 with the characteristic curve D of the absorption coefficient for the modified second working example, it is seen that the rate of increase in the absorption coefficient with the increase in the pulse number is higher for the synthetic silica glass of the modified second working example.

This result confirms that when the cooling rate of the silica glass member from 1273 K to 723 K is set to be as low as 1 K/hour, it is possible to further improve the durability of the synthetic silica glass against ultraviolet rays under the above conditions.

According to the manufacturing method of the synthetic silica glass of the present invention, it becomes possible to produce an improved synthetic silica glass which has a stable structure and a greater durability against ultraviolet rays. In such synthetic silica glass of the present invention, the generation of structural defects is sufficiently suppressed.

It will be apparent to those skilled in the art that various modifications and variations can be made in the synthetic silica glass and its manufacturing method of the present invention without departing from the spirit or scope of the invention. Thus, it is intended that the present invention cover the modifications and variations of this invention provided they come within the scope of the appended claims and their equivalents.

What is claimed is:

1. A method for manufacturing a synthetic silica glass, the method comprising the steps of:

maintaining a silica glass member, which is formed using a flame hydrolysis method and having an OH group concentration of about 500 ppm to about 1300 ppm, at a predetermined holding temperature for a predetermined period of time so as to substantially relax the structure of the silica glass member;

thereafter, cooling the silica glass member to a first predetermined temperature at a cooling rate of about 10 K/hour or less;

thereafter, cooling the silica glass member to a second predetermined temperature at a cooling rate of about 1 K/hour or less; and thereafter, cooling the silica glass member to a third predetermined temperature at a cooling rate of about 10 K/hour or less.

2. The method according to claim 1, wherein the third predetermined temperature is about 800 K or less.

3. The method according to claim 1, wherein the second predetermined temperature is within a range of about 1000 K to about 1050 K.

4. The method according to claim 3, wherein the third predetermined temperature is about 800 K or less.

5. The method according to claims 1, wherein the first predetermined temperature is within a range of about 1200 K to about 1250 K.

6. The method according to claim 5, wherein the third predetermined temperature is about 800 K or less.

7. The method according to claim 5, wherein the second predetermined temperature is within a range of about 1000 K to about 1050 K.

8. The method according to claim 7, wherein the third predetermined temperature is about 800 K or less.

9. The method according to claim 1, wherein the predetermined holding temperature is within a range of about 1223 K to about 1373 K.

10. The method according to claim 9, wherein the third predetermined temperature is about 800 K or less.

11. The method according to claim 9, wherein the second predetermined temperature is within a range of about 1000 K to about 1050 K.

12. The method according to claim 11, wherein the third predetermined temperature is about 800 K or less.

13. The method according to claim 9, wherein the first predetermined temperature is within a range of about 1200 K to about 1250 K.

14. The method according to claim 13, wherein the third predetermined temperature is about 800 K or less.

15. The method according to claim 13, wherein the second predetermined temperature is within a range of about 1000 K to about 1050 K.

16. The method according to claim 15, wherein the third predetermined temperature is about 800 K or less.

17. The method according to claim 1, wherein the first predetermined temperature is about 1223 K, the second predetermined temperature is about 1023 K, and the third predetermined temperature is about 773 K.

18. The method according to claim 1, wherein the silica glass member is formed by expelling combustion gases from a burner, the combustion gases including a hydrogen gas and an oxygen gas, the ratio of the oxygen gas flow rate to the hydrogen flow rate being controlled to be within a range of about 0.2 to about 0.5.

19. The method according to claim 1, wherein the silica glass member to be maintained in the step of maintaining has a diameter of about 200 mm or more and a thickness of about 100 mm or more.

20. The method according to claim 1, wherein the step of maintaining includes maintaining the silica glass member for the predetermined period of time that is sufficient to relax the structure of the silica glass member to an equilibrium state corresponding to the predetermined holding temperature.

21. The method according to claim 1, wherein the predetermined period of time in the step of maintaining is less than about 20 hours.

22. The method according to claim 21, wherein the predetermined period of time in the step of maintaining is about 5 hours to about 10 hours.

23. The method according to claim 1, wherein the synthetic silica glass has a hydrogen molecule concentration of about $1 \times 10^{16}$ molecules/cm$^3$ or greater.

24. The method according to claim 1, wherein the synthetic silica glass has a hydrogen molecule concentration of about $1 \times 10^{18}$ molecules/cm$^3$ or greater.

25. A method for manufacturing a silica glass having a reduced structure determination temperature, the method comprising the steps of:

annealing a silica glass member having a glass state corresponding to a predetermined structure determination temperature, and an OH group concentration of about 500 ppm to about 1300 ppm, the annealing being performed at a first temperature lower than the predetermined structure determination temperature for a time period equal to or longer than a relaxation time of the silica glass member at the first temperature; and thereafter, cooling the silica glass member at such a cooling rate that until the silica glass member reaches a second temperature, the thermodynamical structural relaxation process of the silica glass member substantially follow the temperature changes, the cooling rate being such that below about the second temperature, the thermodynamical structural relaxation process of the silica glass member no longer substantially follow the temperature changes, thereby super-cooling the silica glass member to produce a silica glass having a structure determination temperature lower than the predetermined structure determination temperature.

26. The method according to claim 25, further comprising the step of forming the silica glass member using a flame hydrolysis method.

27. The method according to claim 25, wherein the cooling rate in the step of cooling is about 1 K/hour.

28. The method according to claim 25, wherein the cooling rate in the step of cooling is a variable cooling rate which varies depending on temperature ranges.

29. The method according to claim 25, wherein the predetermined structure determination temperature is about 1400 K to about 1500 K, wherein the first temperature in the step of annealing is within a range of about 1223 K to about 1373 K and the time period during which the annealing is performed is about 20 hours or less, and wherein the second temperature in the step of cooling is about 1100 K, and the cooling rate is about 1 K/hour or less at least near the second temperature.

30. A method for manufacturing a silica glass having a reduced structure determination temperature, the method comprising the steps of:

forming a silica sample having a glass state corresponding to a predetermined structure determination temperature, and an OH group concentration of about 500 ppm to about 1300 ppm;

annealing the silica sample at a first temperature lower than the predetermined structure determination temperature, the annealing being performed for a time period equal to or longer than a relaxation time of the silica sample at the first temperature; and thereafter, cooling the silica sample at such a cooling rate that until the silica sample reaches a second temperature, the cooling process is substantially quasistatic, the cooling rate being such that below about the second temperature, the cooling process no longer is substantially quasistatic, thereby super-cooling the silica sample to produce a silica glass having a structure determination temperature lower than the predetermined structure determination temperature.

31. The method according to claim 25, wherein the silica glass member has an OH group concentration of about 500 ppm to less than 1000 ppm.

32. The method according to claim 1, wherein the silica glass member has an OH group concentration of about 500 ppm to less than 1000 ppm.

33. The method according to claim 30, wherein the silica sample has an OH group concentration of about 500 ppm to less than 1000 ppm.

34. The method according to claim 31, wherein the step of annealing includes maintaining the silica glass member at about 1273 K for about 10 hours, and wherein the step of cooling includes cooling the silica sample from 1273 K to about 723 K at the cooling rate of about 1 K/hour.

* * * * *